United States Patent [19]

Hoyer

[11] 4,158,481
[45] Jun. 19, 1979

[54] SYSTEM AND METHOD FOR VIEWING A THREE-DIMENSIONAL IMAGE USING A TWO-DIMENSIONAL DRAWING

[76] Inventor: Horst W. Hoyer, 165 Watchung Ave., Montclair, N.J. 07043

[21] Appl. No.: 794,028

[22] Filed: May 5, 1977

[51] Int. Cl.² .............................................. G02B 27/22
[52] U.S. Cl. ...................................... 350/144; 350/130
[58] Field of Search ................................ 350/130–132, 350/144, 162 R; 353/10; 250/237 G

[56] References Cited

U.S. PATENT DOCUMENTS

| 2,679,188 | 5/1954 | Gould | 350/144 |
| 3,101,644 | 8/1963 | Lopez-Henriquez | 350/144 |
| 3,501,230 | 3/1970 | Johnston | 353/10 |

OTHER PUBLICATIONS

McCurry, R. E., "Three-Dimensional Displays Utilizing Multiple Source Moire Patterns," *IBM Technical Disclosure Bulletin,* Apr. 1966, vol. 8, No. 11, pp. 1578–1579.

Oster, G., and Nishijima, Y., "Moire Patterns," *Scientific American,* May 1963, pp. 54–62.

*Primary Examiner*—John K. Corbin
*Assistant Examiner*—Scott J. Sugarman
*Attorney, Agent, or Firm*—Eliot S. Gerber

[57] ABSTRACT

Two-dimensional figures which are to be represented in three-dimensional images consist of a series of lines or line segments which may be in the form of hand drawings, two-dimensional printed pictures, filament pictures, photographs, projected pictures, computer displays, cathode ray displays, or LED displays, and may be produced on transparent or opaque backings or, in the case of filament pictures, suspended in a suitable frame. A viewing grating is held a distance above the plane of the figure, causing a three-dimensional image to be represented in a plane other than that of the figure.

10 Claims, 12 Drawing Figures

FIG. 3A Apparent positions of images with eyes focused on grating.

Ref.

Ref.

Ref. ─────────────

Ref. ―――――――――――――――

Ref. ―――――――――――――――

SYSTEM AND METHOD FOR VIEWING A THREE-DIMENSIONAL IMAGE USING A TWO-DIMENSIONAL DRAWING

BACKGROUND OF THE INVENTION

This invention relates generally to a system and method for the viewing of a three-dimensional image from a representation of a two-dimensional figure.

Within the past decade there has been extensive development and application of the computer generated graphical display. Such displays have been extensively applied in aeronautical, civil and mechanical engineering, in electronics, architecture, medical technology and the sciences. While all computer graphic representations are necessarily two-dimensional, there is often a desire to present the appearance of three-dimensional objects and ingenious techniques for such representations have been developed. Among some of the methods which have been used are (i) displaying several orthogonal views; (ii) providing a perspective display of the scene with (a) wire-frame drawings, (b) outline drawings with hidden lines removed, or (c) shaded drawings of objects; and (iii) stereoscopic drawings in which the right and left eyes are presented with slightly different drawings corresponding to the view each eye would normally see of the object.

In one type of conventional stereoscopic drawings a three-dimensional representation is obtained by presenting to the two eyes simultaneously two slightly different pictures corresponding to the view normally seen by either the right or the left eye. Such stereoscopic drawings have appeared in the literature as aids in visualizing the results of crystal structure determinations. In order to view the three-dimensional image, one needs a viewer which will limit the field of vision of each eye to just one of the two drawings. With practice it is also possible for a person to learn to fuse the images without the aid of the special viewer.

Another conventional method which attempts to give the appearance of a three-dimensional image employs the raster principle in which the two views are broken up into narrow vertical strips and the light from each strip is selectively directed towards either the right or the left eye so that each eye sees a slightly different view of the same scene. This method is currently exploited in picture post cards, novelty items and some children's books.

Moiré patterns are produced when figures with periodic rulings are made to overlap. Such patterns will not generally provide a three-dimensional effect.

SUMMARY OF THE INVENTION

The present invention provides a system and method for creating a three-dimensional image from the interaction of a two-dimensional drawing (base illustration) and a viewer situated a short distance above the drawing.

In general, one sees an object due to reflections from its surface. The creation of a three-dimensional image can be analyzed as (i) the creation of a series of images of surface elements in three-dimensional space, and (ii) using the summation of these images to produce a three-dimensional image.

In contrast to conventional stereoscopic drawings, which use two drawings, the present invention utilizes only one drawing to form its three-dimensional image. Unlike moiré patterns, the present invention is not limited to the overlap of two or more periodic rulings. It needs only the parallel lines in the viewer grating and at least one line in the base figure for generation of the three-dimensional image.

Essentially, the method of the present invention is based upon the interaction of a drawing composed of a series of lines in a two-dimensional base figure, with a special viewer. A representative viewer according to the present invention is a grating of fine parallel lines in a single plane. The viewer is held a short distance above the lines of the base figure. A person viewing the base figure through the viewer will see that the lines in the base figure appears to originate in three-dimensional space behind the viewer grating. Those lines in the base figure which makes angles of a few degrees with the grating lines appear to lie above the base. This apparent position of the image above the figure, in what will be termed the z coordinate, falls away towards the paper as the angle increases and becomes equal to the plane of the drawing for lines perpendicular to the lines in the grating. As the angle of the lines increases from 90° to 180° the images appear to be positioned at increasing distances below the plane of the base.

These relative positions depend upon examining the figure with the right eye dominant, that is, with this eye gazing directly at the figure. When first viewing this and the other figures it is helpful for the person viewing the image to position the right eye approximately perpendicular to the plane of the drawing. It will soon become apparent that the three-dimensional effect depends upon the relative orientation with which the two eyes view the drawings. A slight rotation of the head which makes the left eye dominant and will result in an inversion of the depth relationships. Each of the drawings (the base figure) of the present invention has a reference line. The three-dimensional effect has been calculated for positions in which the grating lines of the viewer are parallel to these reference lines.

The three-dimensional effect achieved through the figures of the present invention is believed to be due to separation of the lines into line segments. The eyes, in focusing on the grating, see two images of any one line segment, one for the left eye, the second for the right eye. While the apparent linear separation of the two images in the plane of the base is d, the interpretation of the images by the mind does not involve d (the linear separation) directly, but rather such interpretation is based upon $d \sin \theta$, the shortest distance which separates the two images in the plane of the images. Here $\theta$ is the angle which the line in the base figure makes with the line of the grating. Thus, the apparent distance $l'$ of the line from the viewer grating is not $l$ (the actual distance) but is:

$$l' = \frac{d \sin \theta}{2 \tan(\alpha/2)} = l \sin \theta$$

It should, however, be noted that once the angle $\theta$ exceeds 90° a partial reversal of the left and right images results. In that case the image perceived by the right eye lies beneath the image perceived by the left eye. Fusion of the two images now requires an apparent shift of the right eye image that is upward and to the right instead of a motion downward and to the right. Here the terms "above" and "below" and "upward" and "downward" are used to indicate position and direction in the plane of the figure as viewed by the reader.

The mind considers these two positions differently and interprets lines at angles less than 90° as being a distance in front of the drawing, while those lines with angles greater than 90° are interpreted as lying behind the plane of the drawing. Thus, the effective distances range of +1 to −1 where 1 is the distance from the drawing to the viewer grating. Thus, a three-dimensional image can be created by a pattern of such line segment images, each image located at a point in space with coordinates x,y,z determined by a function $f(x,y,\theta)$ of each line segment on a two-dimensional drawing where x and y refer to coordinates in the plane of the paper and $\theta$ to the angle between the line segment and the lines in the viewer grating. The image can appear to move in three-dimensional space by suitable selection of its x,y and $\theta$ coordinates.

Translation of the image in planes parallel to the xy plane involves incremental changes of x and y during unit time intervals. Translations which involve the z direction, that is, in direction away from the xy plane of the drawing, are accomplished through incremental changes on $\theta$. However, these z translations involve the additional complication of an apparent change in the size of the object as it moves towards or away from the viewer. A first approximation of apparent change in size of the image could be presented by making both x and y linear functions of the distance in the z direction.

Rotation of these elementary forms involve a further step in sophistication and difficulty; however, in principle it could involve transformation to a polar coordinate system where the R, $\theta$ and $\psi$ coordinates of each surface element would all be a function of the x,y and $\theta$ coordinates of the lines in the base figure. Rotation of the image would then involve incremental changes of $\theta$ and $\psi$ for each element. In practice, however, the programming techniques for three-dimensional translation, rotation and scaling are current state of the art which can be applied once the program for the desired image has been written.

The system and method of the present invention uses a viewer to create an apparent image extending above and below the plane of the two-dimensional figure. This system and method may have application to computer-graphics and may be used in connection with design engineering, with radar displays in which three-dimensional visualization of a region is desirable, and with books and articles in which three-dimensional illustrations are desirable.

FEATURES AND OBJECTIVES OF THE INVENTION

It is an objective of the present invention to provide a system and method to provide a three-dimensional representation from a two-dimensional figure.

It is a further objective of the present invention to use computer graphics programs for translation, rotation and scaling of drawings to provide three-dimensional images which will allow for visualization of objects and permit more accurate representation of structures than is possible using the representation techniques of the prior art.

It is a further objective of the present invention to provide for color as well as black and white three-dimensional representations of drawings which may be computer displays or printed or hand-made drawings based upon computer displays.

It is a further objective of the present invention to provide an effective system to illustrate three-dimensional architectural and engineering designs.

It is a further objective of the present invention to provide an effective system to convert cathode ray tube (CRT) displays into three-dimensional images.

DESCRIPTION OF THE DRAWINGS

Other features and objectives of the present invention will be apparent from the following detailed description, which description should be taken in conjunction with the accompanying drawings.

In the drawings:

FIGS. 3(a) and 3(b) are diagrams of the illustrative base showing the positioning of illustrative base lines;

DETAILED DESCRIPTION OF THE INVENTION

Figure 1:
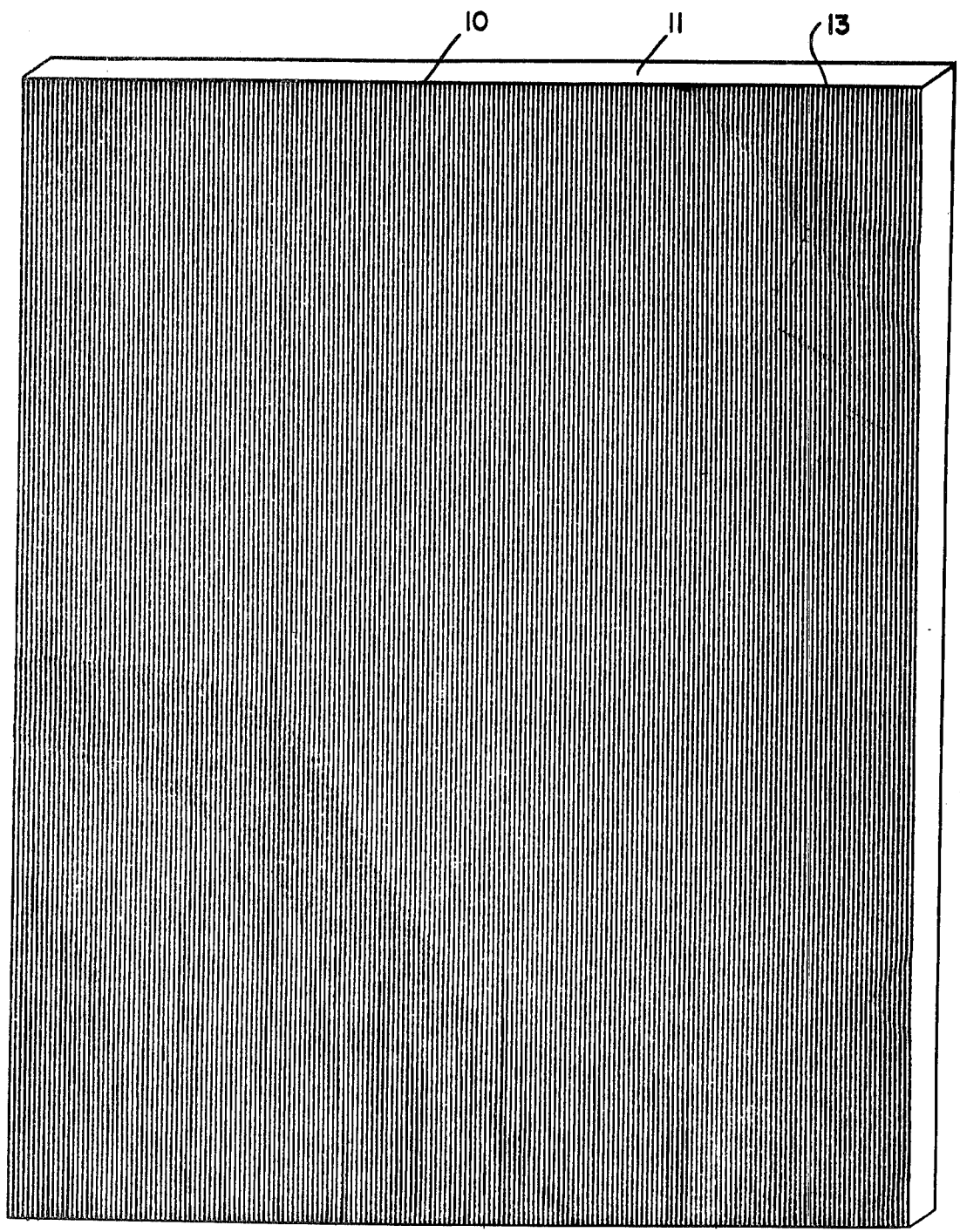
FIG. 1 is a top plan view of the grating of one type of viewer.

FIG. 1 is a top plan view of one type of viewer. The grating 13 is an array of parallel black lines 10 printed on a light transmissive supporting sheet 11. The basic material for the preparation of this viewer is commercially available in the graphic and commercial art field as "shading film" or "overlay film" and is used in the creating of patterns and displays. The parallel lines 10 are surface printed on a removable film with a thicker backing sheet from which the top film can be stripped and transferred to the appropriate transparent plastic resin sheet 11 which is of sufficient thickness to be rigid. Similar patterns are permanently printed on translucent material such as acetate or mylar. Unfortunately, in the commercially available films as much as 50% of the surface may consist of dark lines and this imparts an overall dark hue to the drawings when observed through a viewer made with such film. This darkening can be greatly reduced by making the black lines narrower than the transparent areas or by using an overlay in which the lines are drawn with white ink or in the background color of the CRT display. Current state of the art should permit manufacture of transparent films with parallel colored lines occupying 10% or less of the total surface area and the remainder being transparent. In any event, preferably the printed colored lines are less than 20% of the surface area.

Another type of viewer which has been constructed in accordance with the present invention is an array of parallel cylindrical lenses having a semi-cylindrical cross-section and vary narrow in width, for example, 30 such lenses to an inch. This viewer provides greater mechanical stability. The important characteristic is large refraction along the line joining the lenses. The lense aspect, although not essential, does provide improved resolution of images.

A preferred viewer of stretched parallel filaments provides good optical quality since there is only air between the drawing and the eye. For example, nylon monofilaments, 4 lb. fishing line, are stretched taut on a frame so that they are parallel and lie in a single plane similar to the black lines of FIG. 1. Preferably there are 20-50 filaments in an inch, measured perpendicular to the direction of the filaments.

It should be emphasized that the lines of the viewer grating need not be parallel for the three-dimensional effect but parallelism is necessary for exact definition of the position of the image in the z direction. However, the spacing of the lines is important. The three-dimensional effect does not occur for large spacings. Some estimates indicate that the threshold at which the effect occurs is for line spacings in the viewer of approximately 1.2 millimeters. The effect is apparent, but reduced, at line separation of 0.02 mm; but it is possible that the reduction in the quality of the three-dimensional image may be due to the thickness of the line in the drawing relative to the width of line separation in the viewer. The plane of the viewer grating is positioned, for example, by a movable frame stand from 1 cm to 25 cm in distance and substantially parallel to the plane of the drawing.

Figure 2:
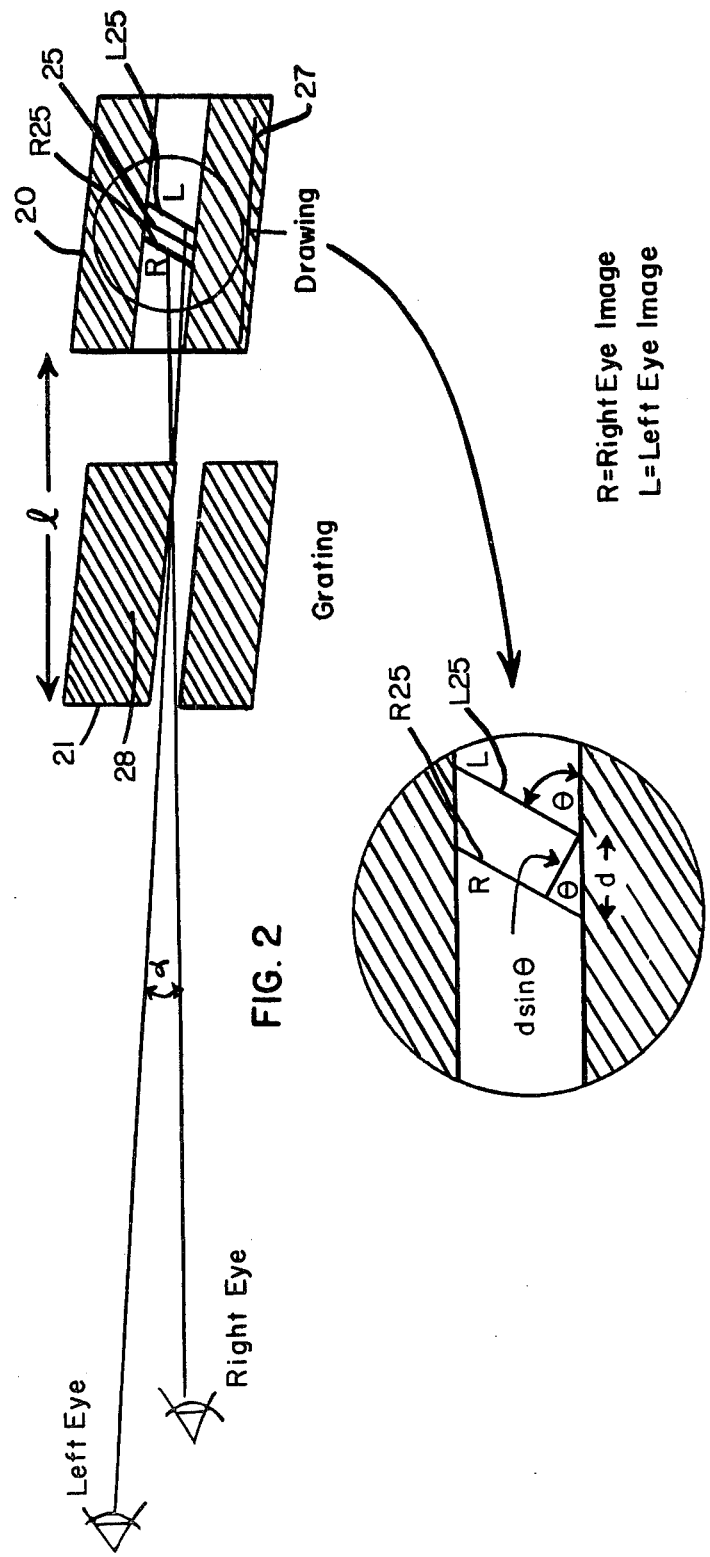
FIG. 2 is a diagram of the apparatus of the present invention showing the relative positioning of a viewer grating with respect to the illustrative base.

FIG. 2 is a diagram of the apparent positions of images with eyes focused on the viewing grating. The lines of the grating are parallel to the temporal line which is the imaginary line between the viewer's left and right eyes, and refers to the sidewise motion of the eyes. For a vertical drawing, for example, a drawing on a wall, the lines of the grating are horizontal. The viewer or grating 21 breaks up the image of the line 25 of the drawing 20 into small line segments which appear as three-dimensional images, either between the grating 21 and the drawing 20 or behind the drawing 20.

Figure 3B:
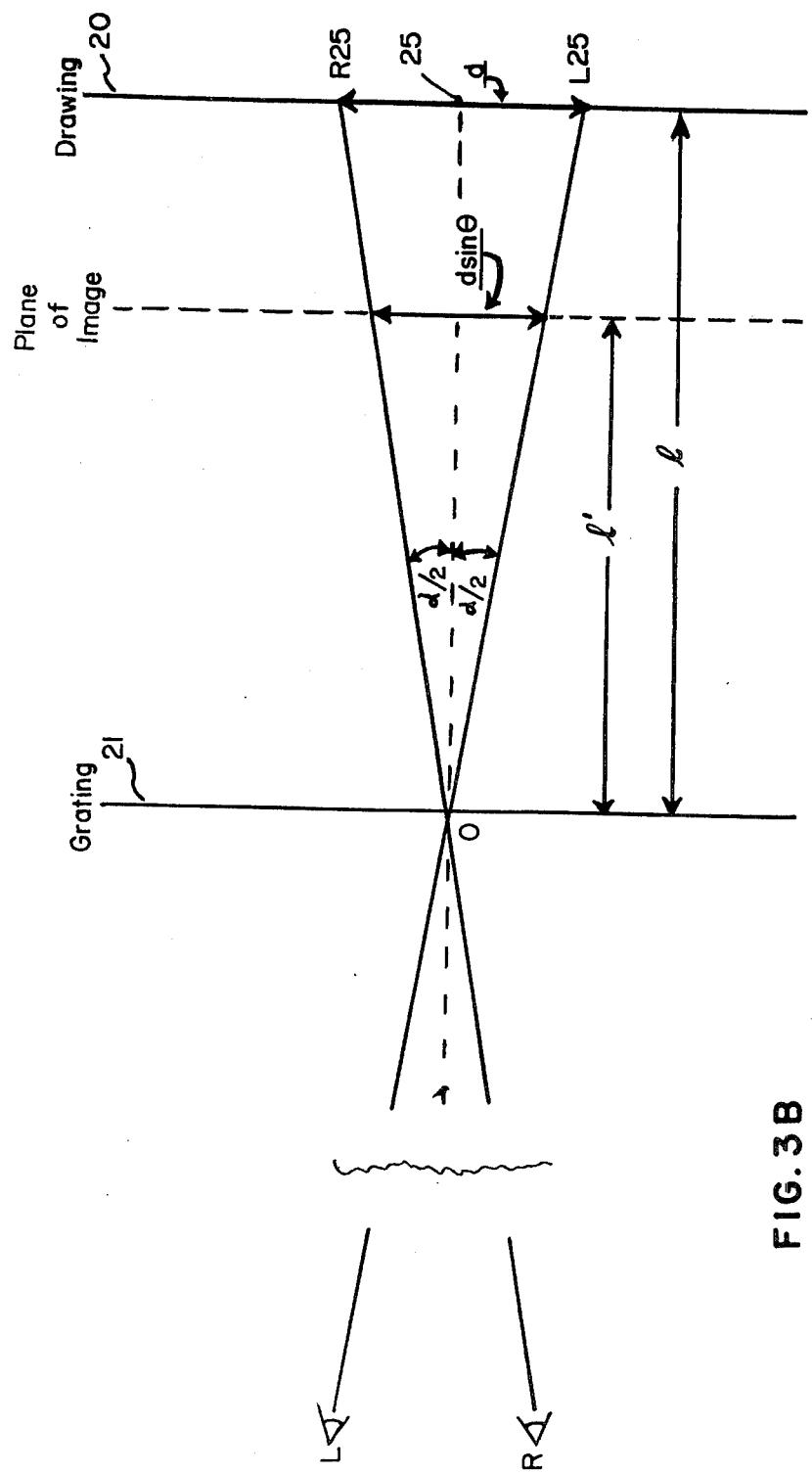

FIGS. 3A and 3B show the apparent positioning of the right image R25 and the left image L25 of the line 25. In general, and without using the grating of the present invention, a line, when seen with only the left eye, will not appear to be in the same position when viewed with only the right eye; and neither the left eye apparent position, nor the right eye apparent position, will be the same as the actual position as seen by using both eyes simultaneously. Each eye, in the process of defining an object, sees a different image of that object. In FIGS. 3A and 3B the eye, without the aid of the viewer 21, sees two images R25 and L25. In the plane of the drawing 20 these images R25, L25 appear to be separated by a linear distance d. However, when viewed out of the plane of the drawing, the mind interprets the separation not as their actual linear separation d but as the shorter perpendicular separation between the two images. When viewed through the grating lines of viewer 21, which are parallel to the reference line 27, the separation would be seen as d sine $\theta$.

Normally the mind would assimilate two apparent images R25 and L25 to create one image of the line 25. However, when viewer 21 is interposed between the drawing and the eyes are focused on the viewer, the mind can no longer assimilate these two images in the same manner. The viewer 21 causes the images R25 and L25 to be broken into small image segments out of the plane of the drawing with apparent separation d sin $\theta$. The mind assimilates these image segments based on its interpretation of this separation. Thus when $\theta$ is less than 90° the images appear above the plane of the drawing, for $\theta = 90°$ the images appear in the plane of the drawing and for $\theta$ greater than 90° the image appears behind the plane of the drawing.

In FIG. 3B it may be seen that:

$$\tan \frac{(\alpha)}{(2)} = \frac{d/2}{l} = \frac{(d \sin \theta)/2}{l'}$$

or $l' = l \sin \theta$

This means that lines at an angle $\theta$ with respect to the reference line 27 will appear not in the plane of the drawing a distance l from the grating, but a shorter distance $l'$ from the grating.

It is more convenient to use the plane of the drawing rather than that of the viewer as the reference plane since images appear both above and below this plane. If distances above the drawing are designated as +a and those below as −a, with angles 0° to 90° and 0° to −90° respectively, the appropriate equation is $$z = a/l = \pm(1-\sin \theta) \qquad 2.$$

The (−) sign applies to distances above the plane of the drawing and the (+) sign to distances below this plane.

Figure 4:
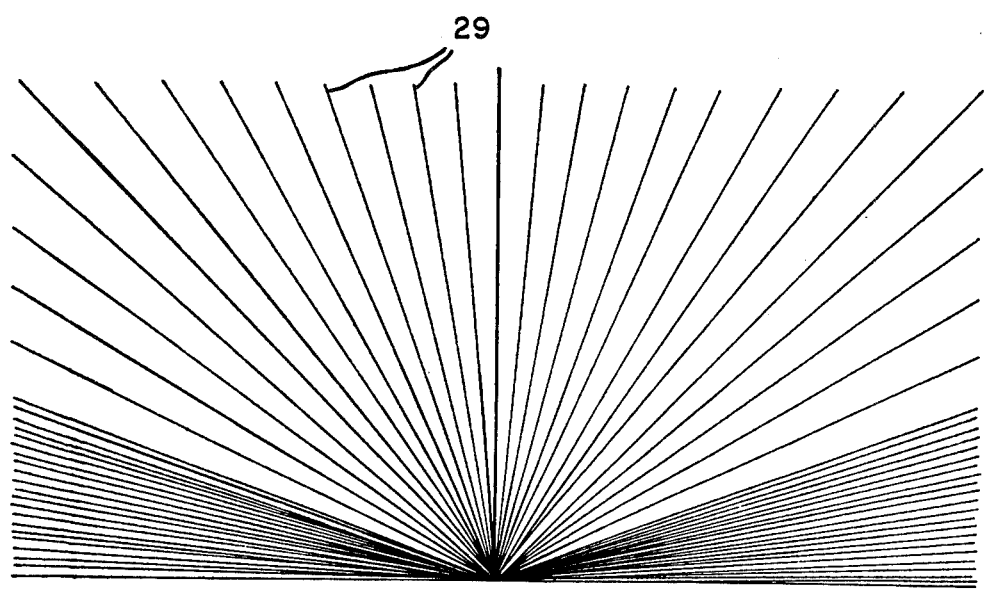
FIG. 4 is an array of lines at various angles to the reference line and consequently the viewer, which, upon visualization through the viewer, appear above and below the plane of the base illustration.

FIG. 4 shows an array of lines 29 drawn at various angles from a common center point. Lines drawn at 90° to the grating lines, i.e., to the reference line, will lie in the plane of the drawing since (1−sin 90°)=0 those with angles less than 90° will result in images above the reference plane, and those drawn with angles between 0° and 180° will lie below this plane.

Two methods are possible for implementing this for three-dimensional image formation. One can, for example, draw a series of lines of the form $$y = mx + b; \qquad 3.$$

where b is the customary intercept on the y axis and which is given incremental values in order to generate the three-dimensional image.

The slope m which may be a constant or variable quanity determines the x coordinates of the image according to equation (2) and the relationship.

$$m = \tan \theta = f(x,y) \qquad 4.$$

The second method involves determining the value of $z = a/l$ for a particular surface patch and then filling in this patch with line segments of the appropriate angle as determined by equation (2). Both methods are illustrated in the examples that follow.

$$y = [\tan \arcsin (1-z)]x + b \qquad 5.$$

Figure 5:
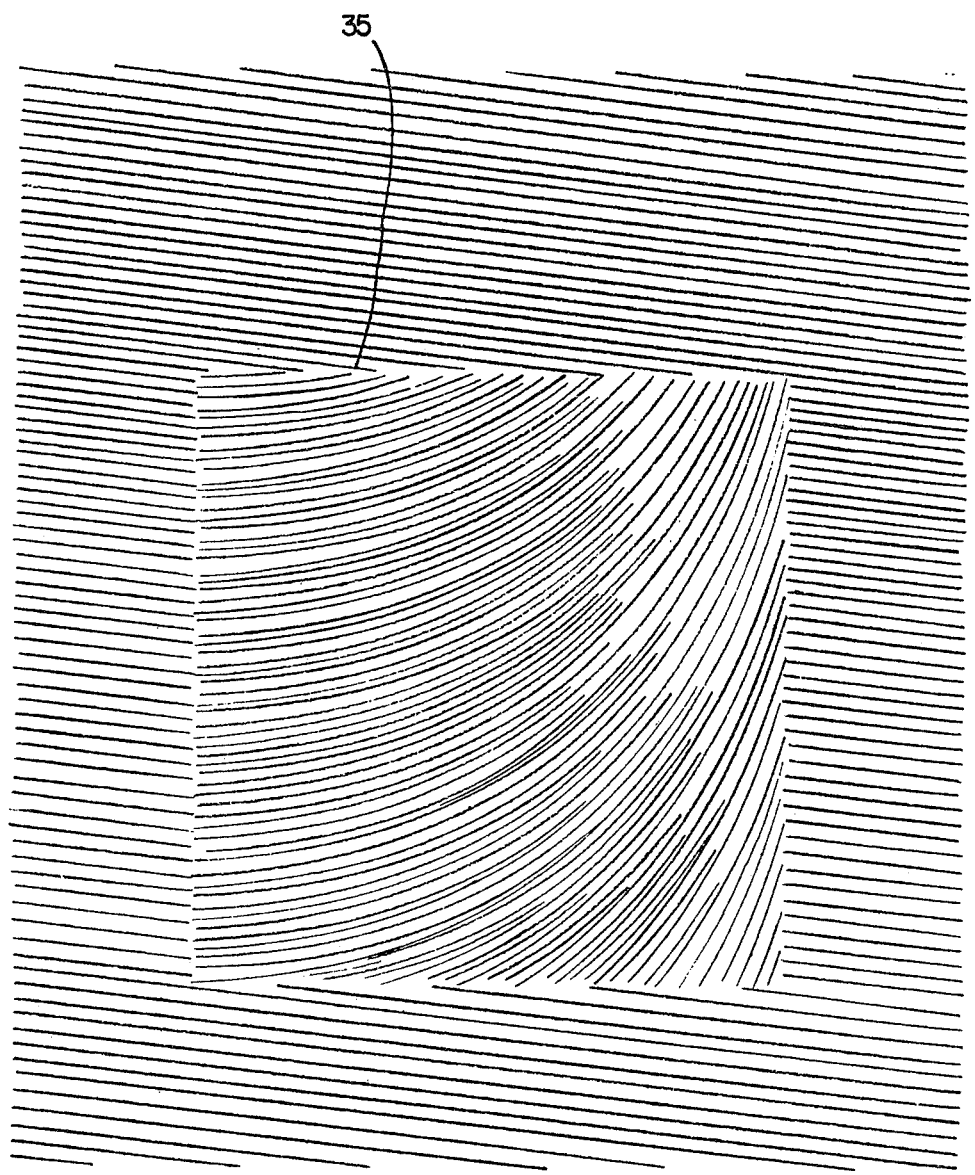
FIG. 5 is a base illustration of a wall receding into the background.

FIG. 5 represents a vertical wall 35 receding from the viewer. Now the required form of f(x,y) is $$z = f(x) - (1 - kx)$$

since z recedes at a constant rate. For purposes of illustration we select k = 1 so that the equation for the series of line segments becomes $$\frac{y_{i+1} - y_i}{x_{i+1} - x_i} = m_i \qquad 7.$$

$$m_i = \tan \arcsin x \qquad 8.$$

FIG. 5 was constructed according to equations (7) and (8). The area of the wall was divided into twenty equal vertical regions (twenty equally spaced increments in x). Initial values of $x_o$ and $y_o$ were set equal to zero and twenty sets of $x_i$ and $y_i$ were then calculated, plotted and connected by sight for best fit. This curve was then translated in the y direction to complete the image of the wall. Obviously a computer could be used to generate the entire series of curves and then display the set on a CRT terminal. Cropping to the desired shape of the wall could be done by standard windowing techniques. Rotation of the wall through 90° would generate a receding horizontal plane, a figure obtainable from equation (7) by interchanging x and y.

Figure 6:
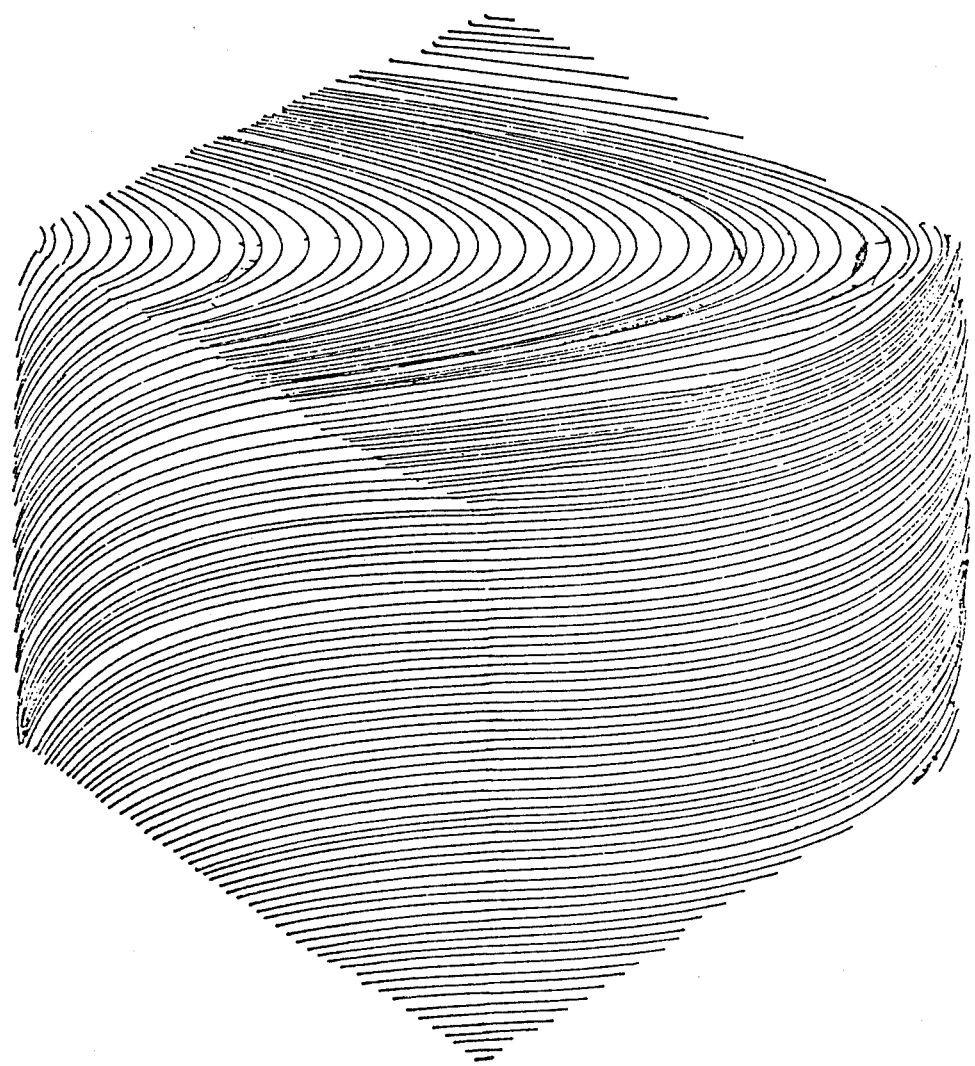
FIG. 6 is a base illustration of a cube.

FIG. 6 is of a three-dimensional cube obtained by combining two walls and a horizontal plane.

Figure 7:
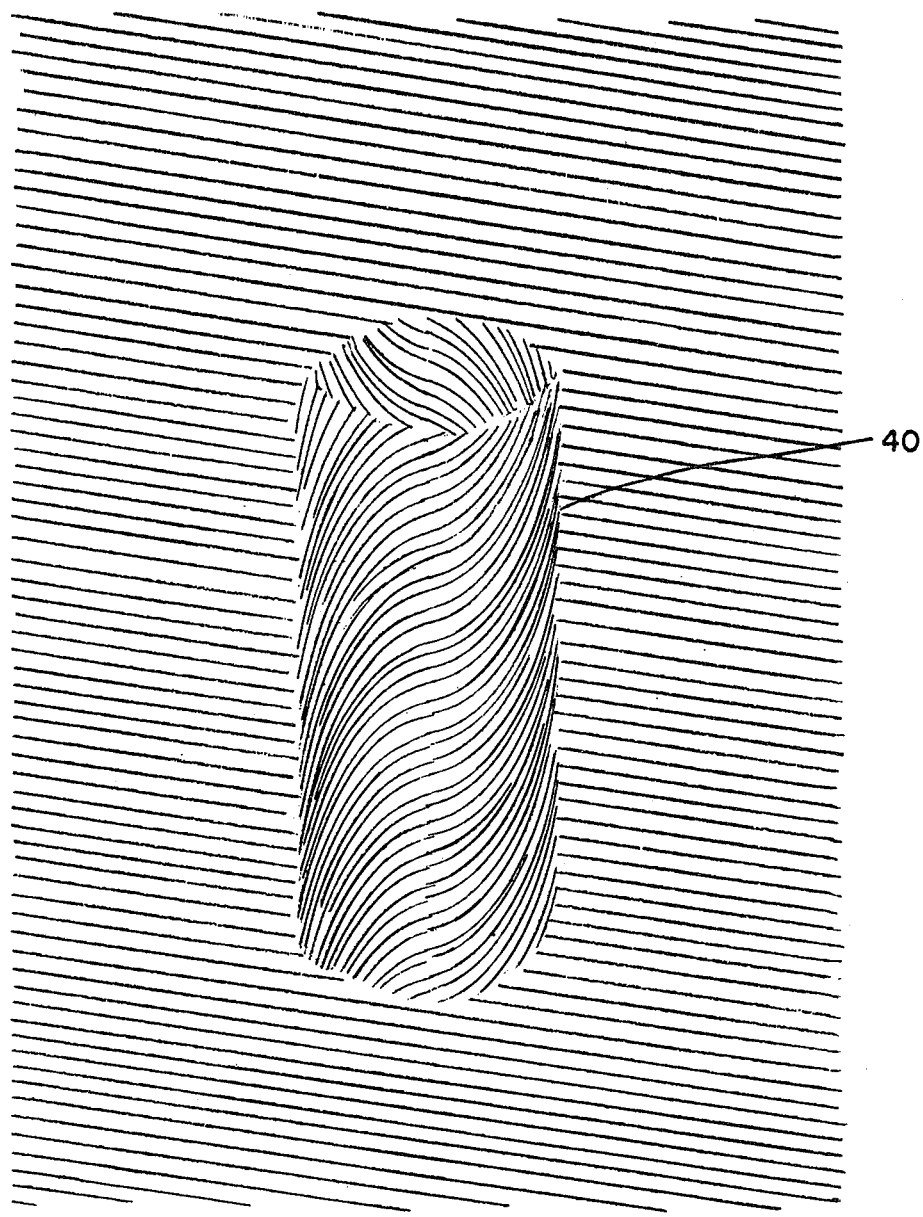
FIG. 7 is a base illustration of a cylinder.

FIG. 7 is a three-dimensional model of a circular cylinder 40 with its axis parallel to the y axis. Since a cross-section perpendicular to this axis obeys the equation $$x^2 + z^2 = R^2$$

$$z = f(x) = (R^2 - x^2)^{\frac{1}{2}}$$

where R is the radius of curvature of the cylinder. Equation (7) is now combined with $$m = \tan \arcsin (1 - (R^2 - x^2)^{\frac{1}{2}}) \qquad 9.$$

to produce the cylinder illustrated in FIG. 7. Analysis similar to the above yields a set of lines for a spherical image 44 of FIG. 8.

$$m_1 = \tan \arcsin (1 - (R^2 - x^2 - y^2)^{\frac{1}{2}}) \qquad 10.$$

Figure 9:
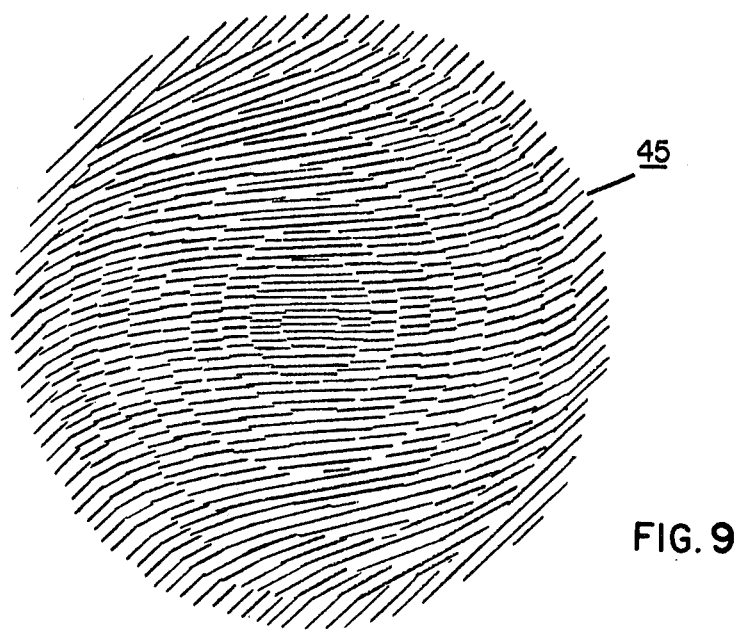
FIG. 9 is a base illustration of a sphere represented by continuous curves.
Figure 8:
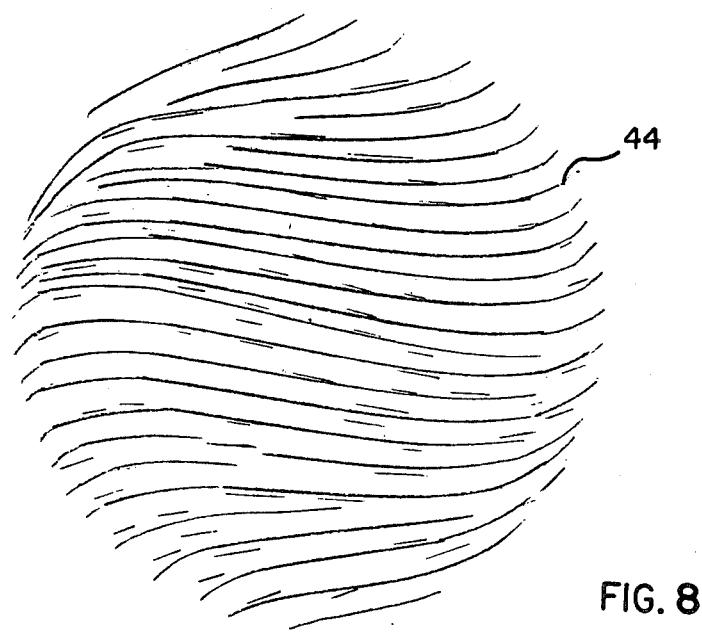
FIG. 8 is a base illustration of a sphere represented by line segments.

Equation (10) could be rearranged, solved for y and the set drawn by computer. However, an alternative technique will be described. For any object it is possible to identify surface regions which have the same value of coordinate z. In such a region patches of line segments all with the same slope consistent with the value of z may be drawn. Such an approach is feasible for a spherical surface since cross-sections parallel to the xy axis at a distance c from the center of the sphere obey the equation $$x^2 + y^2 = (R^2 - z^2) = R_1^2$$

and may be represented by line segments on the circle each drawn with an angle given by $\sin \theta = 1 - (R^2 - R_1^2)^{\frac{1}{2}}$. The sphere 45 of FIG. 9 was drawn in this manner. The space defining the sphere was divided into ten equal segments of the proper slope for that value of z which characterized its average position in space. FIG. 8 illustrates a slightly different way of drawing the sphere in that now only a narrow band of line segments are drawn at only five selected values of z. These were then connected by "best fitting" curves drawn by sight.

Figure 10:
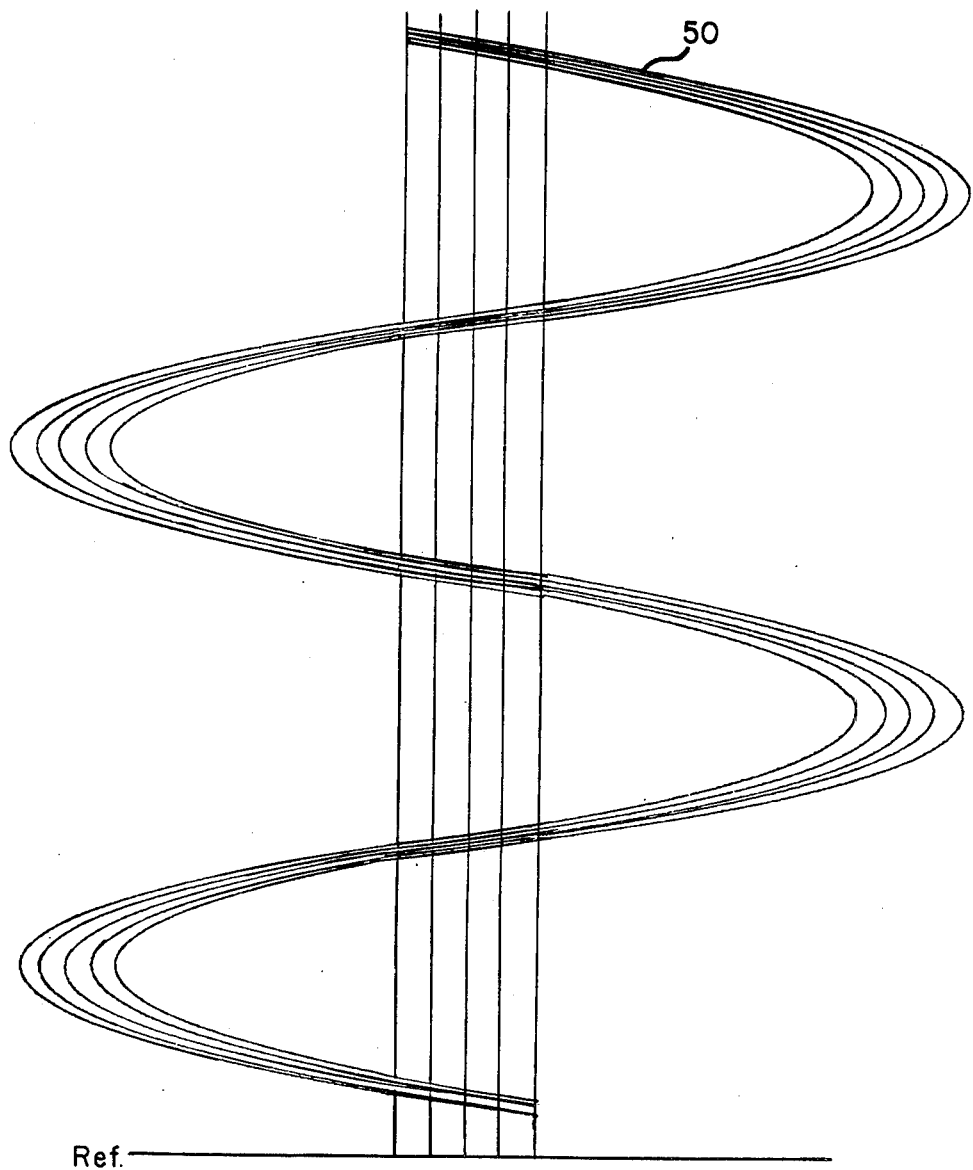
FIG. 10 is a base illustration of a spiral helix.
Figure 11:
FIG. 11 is an enlarged cross-section of another embodiment of a viewer for use in the present invention.

FIG. 10 is a three-dimensional image of a spiral helix 50 drawn by tracing a parabolic curve.

What is claimed is:

1. An apparatus for viewing a three-dimensional effect of a two-dimensional figure comprising:
    a viewing grating composed of a series of colored and parallel lines in a first plane with transparent areas between said colored lines,
    a base figure composed of a series of individual lines which form a figure of non-periodic non-repeating patterns in a second plane and an imaginary horizontal reference line in the second plane and at an angle $\theta$ from each of said individual lines, where angle $\theta$ may vary for each individual line,
    means for holding the viewing grating a distance l above the base figure with the first plane of the grating being substantially parallel to the second plane of the figure and with a grating colored line aligned in parallel with said reference line, said reference line being parallel to and running in the direction of an imaginary temporal line between the viewer's left and right eyes, the distance l being arbitrary but being conveniently taken, thus creating a three-dimensional effect in a plane above or below the plane of the figure and at an apparent distance $z = \pm(1 - \sin\theta)$ therefrom.

2. The apparatus for three-dimensional effect of claim 1 wherein the base figure is a computer generated display.

3. The apparatus for three-dimensional effect of claim 1 wherein the parallel lines of the viewing grating comprises a series of parallel filaments.

4. The apparatus for three-dimensional effect of claim 1 wherein the viewing grating comprises a light transmissive supporting sheet and said lines are surface lines printed thereupon, said printing comprising less than 50% of the area of said sheet.

5. An apparatus for viewing a three-dimensional effect of a two-dimensional figure comprising:
    a viewing grating composed of a series of cylindrical lenses which are in parallel and in a first plane with transparent areas between said lenses,
    a base figure composed of a series of individual lines which form a figure of non-periodic non-repeating patterns in a second plane and an imaginary horizontal reference line in the second plane and at an angle $\theta$ from each of said individual lines, where angle $\theta$ may vary for each individual line,
    means for holding the viewing grating a distance l above the base figure with the first plane of the grating being substantially parallel to the second plane of the figure and with a grating lens aligned in parallel with said reference line, said reference line being parallel to and running in the direction of an imaginary temporal line between the viewer's left and right eyes, the distance l being arbitrary but being conveniently taken, thus creating a three-dimensional effect in a plane above or below the plane of the figure and at an apparent distance $z = \pm(1 - \sin \theta)$ therefrom.

6. The apparatus for three-dimensional effect of claim 5 wherein the base figure is a computer generated display.

7. A method for viewing a three-dimensional effect of a two-dimensonal figure comprising:
    positioning a viewing grating an arbitrary distance above a base figure, the viewing grating composed of a series of parallel colored lines in a first plane with transparent areas between said colored lines,
    said base figure comprised of a series of individual lines which form a figure of non-periodic non-repeating patterns in a second plane and a horizontal imaginary reference line in the second plane and at an angle $\theta$ from each of said individual lines, where angle $\theta$ may vary for each individual line, the said positioning of the viewing grating above the base figure being with the first plane of the grating substantially parallel to the second plane of the figure and with a grating colored line aligned in parallel with said reference line, said reference line being parallel to and running in the direction of an imaginary temporal line between the viewer's left and right eyes, thus creating a three-dimensional effect in a plane above or below the plane of the figure and at an apparent distance $z = \pm(1 - \sin\theta)$ therefrom.

8. The method for three-dimensional representation of claim 7 and including the step of generating the base figure by a computer generated display.

9. A method for viewing a three-dimensional effect of a two-dimensional figure comprising:
positioning a viewing grating an arbitrary distance above a base figure, the viewing grating composed of a series of parallel cylindrical lenses, which lenses are elongated,
said base figure comprised of a series of individual lines in a second plane and a horizontal imaginary reference line in the second plane and at an angle $\theta$ from each of said individual lines, where angle $\theta$ may vary for each individual line,
the said positioning of the viewing grating above the base figure being with the first plane of the grating substantially parallel to the second plane of the figure and with the grating lenses aligned in parallel with said reference line, said reference line being parallel to and running in the direction of an imaginary temporal line between the viewer's left and right eyes, thus creating a three-dimensional effect in a plane above or below the plane of the figure and at an apparent distance $z = \pm(1 - \sin\theta)$ therefrom.

10. The method for three-dimensional effect of claim 9 and including the step of generating the base figure by a computer generated display.

* * * * *